July 28, 1942.   E. A. EBERT   2,291,538
AUTOMATIC PHONOGRAPH
Filed Feb. 14, 1940   9 Sheets-Sheet 1

INVENTOR
Edward A. Ebert

July 28, 1942.  E. A. EBERT  2,291,538
AUTOMATIC PHONOGRAPH
Filed Feb. 14, 1940  9 Sheets-Sheet 2

INVENTOR
Edward A. Ebert
By:
Sheridan, Davis & Cargill
Attys.

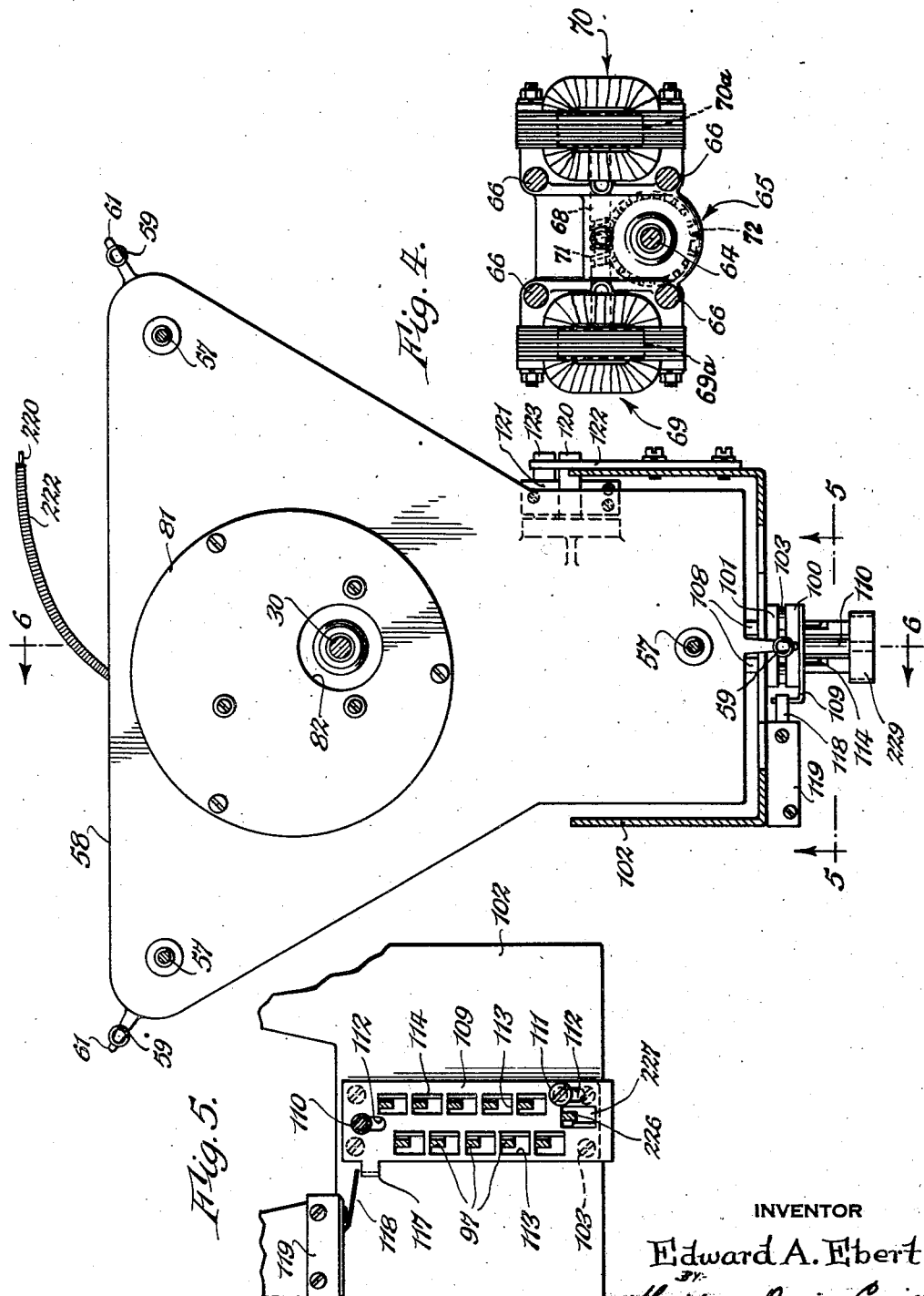

July 28, 1942.　　　E. A. EBERT　　　2,291,538
AUTOMATIC PHONOGRAPH
Filed Feb. 14, 1940　　　9 Sheets—Sheet 4

INVENTOR
Edward A. Ebert

July 28, 1942.   E. A. EBERT   2,291,538
AUTOMATIC PHONOGRAPH
Filed Feb. 14, 1940   9 Sheets-Sheet 5
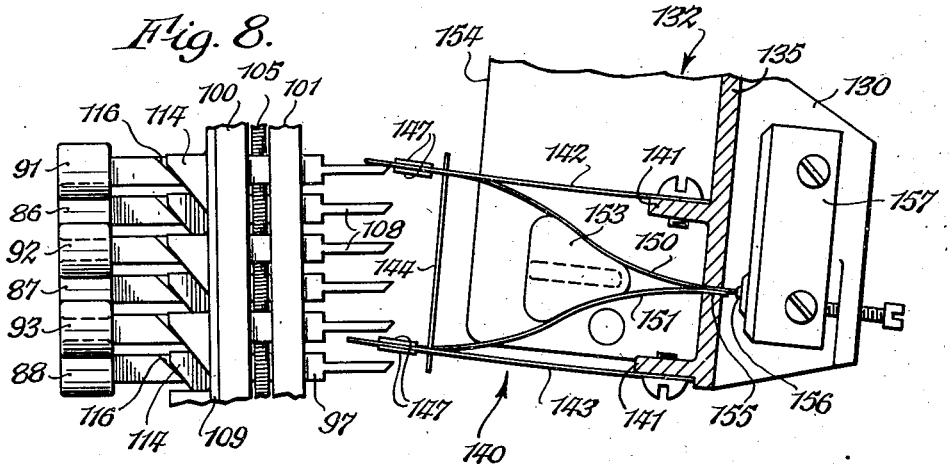
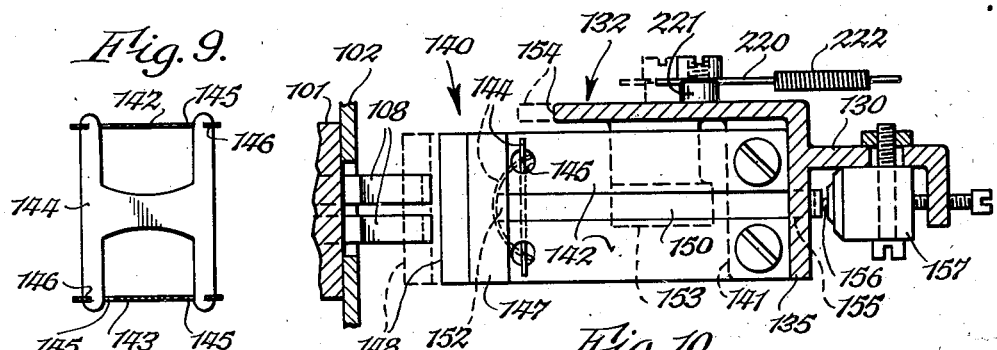
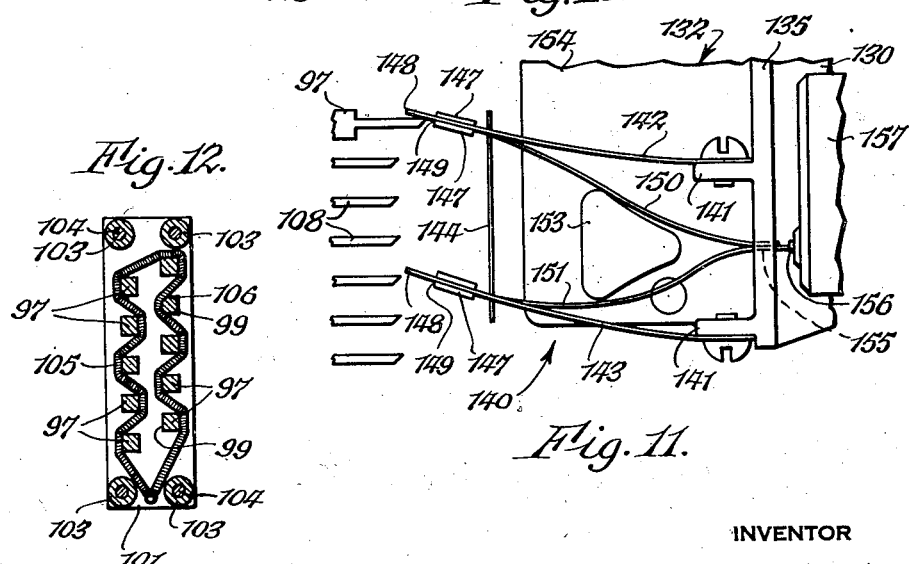
INVENTOR
Edward A. Ebert

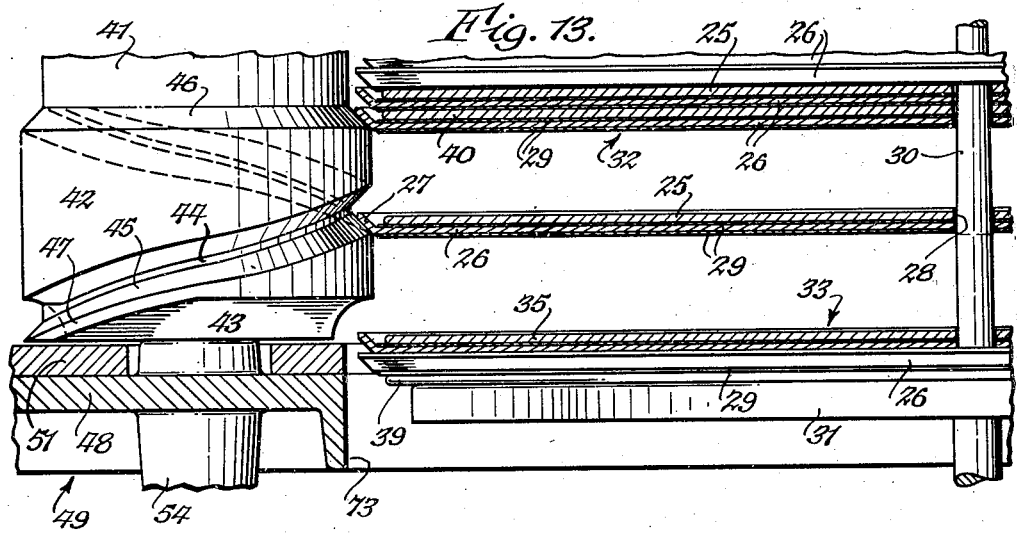

July 28, 1942.  E. A. EBERT  2,291,538

AUTOMATIC PHONOGRAPH

Filed Feb. 14, 1940  9 Sheets-Sheet 7

INVENTOR
Edward A. Ebert

Patented July 28, 1942

2,291,538

UNITED STATES PATENT OFFICE 2,291,538

AUTOMATIC PHONOGRAPH

Edward A. Ebert, Buffalo, N. Y., assignor to Rock-Ola Manufacturing Corporation, Chicago, Ill., a corporation of Delaware Application February 14, 1940, Serial No. 318,906

46 Claims. (Cl. 274—10)

This invention relates to an automatic phonograph of the kind wherein provision is made for selective playing of the records.

In general, the phonograph comprises, (1) a turntable upon which the lower part of a two-part record stack is carried, (2) a tone arm which is movable between the two parts of the record stack to play the topmost record of the lower stack part, (3) elevating and lowering means upon which the upper part of the stack is supported in spaced relation with respect to the lower part to provide a clearance for the tone arm and which is operative to transfer records from each stack part to the other so that any record may be moved from either stack part to a topmost portion on the lower stack part, (4) means for elevating the turntable as records are transferred from the lower stack part to the upper and for lowering the turntable as records are transferred from the upper stack part to the lower so that all records will be played at the same elevation and (5) means for selectively controlling the operation of the foregoing mechanisms, whereby to enable the desired records to be played at will.

One object of the invention is to reduce to a minimum the interval between the time when a selection is made and the time when the playing of the record begins and between the time when the playing of a record is completed and the time when the playing of a succeeding, previously selected, record begins, this object contemplating, (1) the elevating and lowering of the records in such a manner that when the selected record reaches the elevation at which it is to be played the space for the tone arm has already been provided so that the latter can be moved immediately over the record and rested in the sound groove, (2) the termination of each sequence of operations performed in the playing of a record without restoring the turntable and records to their original positions and, (3) the termination of each sequence of operations with the turntable supporting one of the records at the elevation at which it was played with the records above it elevated to provide a clearance for the tone arm, whereby in the event that the same record is again selected the tone arm will be immediately moved over it and rested in the sound groove.

A further object is to provide a phonograph which is so designed that a minimum of motive power is required for operating purposes, thereby enabling the use of shaded-pole and other types of inexpensive driving motors and insuring economy in current consumption.

A still further object is to provide for facility in replacing old records with new or current ones.

A still further object is a phonograph wherein provision is made for compensating for warping of the records.

A still further object is to provide a phonograph wherein a minimum number of parts are exposed to view and wherein such parts as are exposed may be so designed and arranged as to achieve pleasing and attractive ornamental effects.

A still further object is a phonograph wherein the playing of the records is controlled by a simplified, positively acting mechanism which is so designed that ample space is provided for the fingers of the operators and the selector elements identified with the individual records.

A still further object is to provide a novel design and arrangement of the parts of the phonograph, whereby compactness, simplicity and economy in construction are obtained, production methods are promoted and the use of mechanisms which must be accurately adjusted or which are likely to get out of adjustment easily are avoided.

The invention is illustrated in the accompanying drawings in which:

Figure 4 is a similar section taken along line 4—4 of the same figure.

Figure 5 is a vertical section through the selector elements of the selecting mechanism and is taken along line 5—5 of Figure 4.

Figure 8 is a similar view showing the same parts of the selecting mechanism in cancelling positions.

Figure 9 is a detail view taken along line 9—9 of Figure 7.

Figure 10 is a fragmentary sectional view taken along line 10—10 of Figure 7.

Figure 11 is a detail view generally similar to Figure 7 but illustrating positions which the parts may assume, without injury, in the event of failure of any of the control mechanisms.

Figure 12 is a vertical section through the selector elements of the selecting mechanism and is taken along line 12—12 of Figure 7.

Figure 13 is an enlarged sectional view taken along line 13—13 of Figure 1, one of the records and its holder being shown in an intermediate position between the two parts of the stack.

Figure 14 is a similar view showing the elevating and lowering screws in position to engage the topmost record holder on the turntable.

Figures 15 and 16 are sectional views through the stack part supported upon the turntable and illustrate modified forms of record holders.

Figure 1:
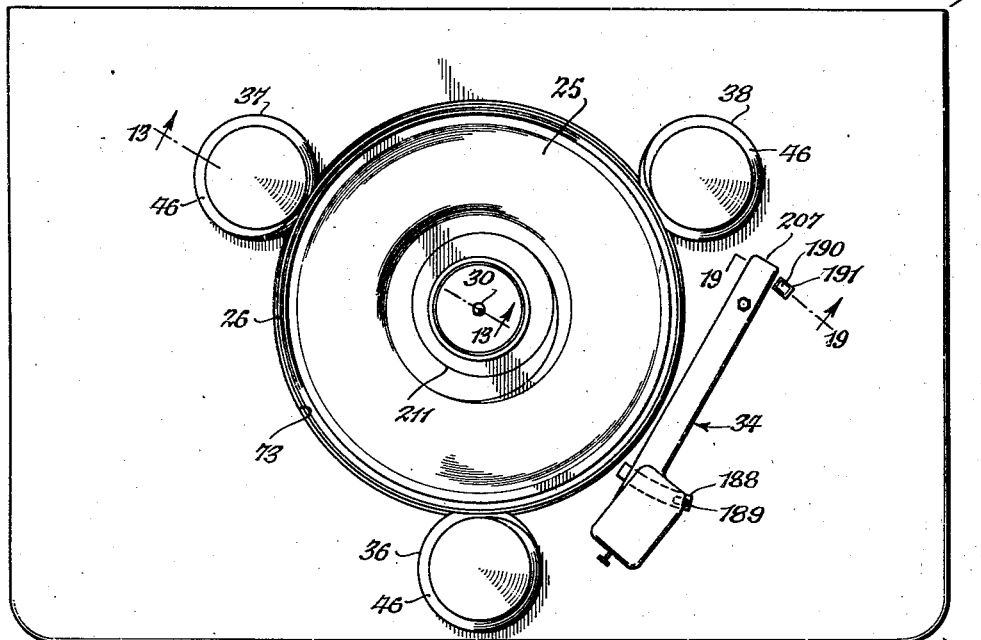
Figure 1 is a top plan view of a phonograph embodying the features of the invention.
Figure 2:
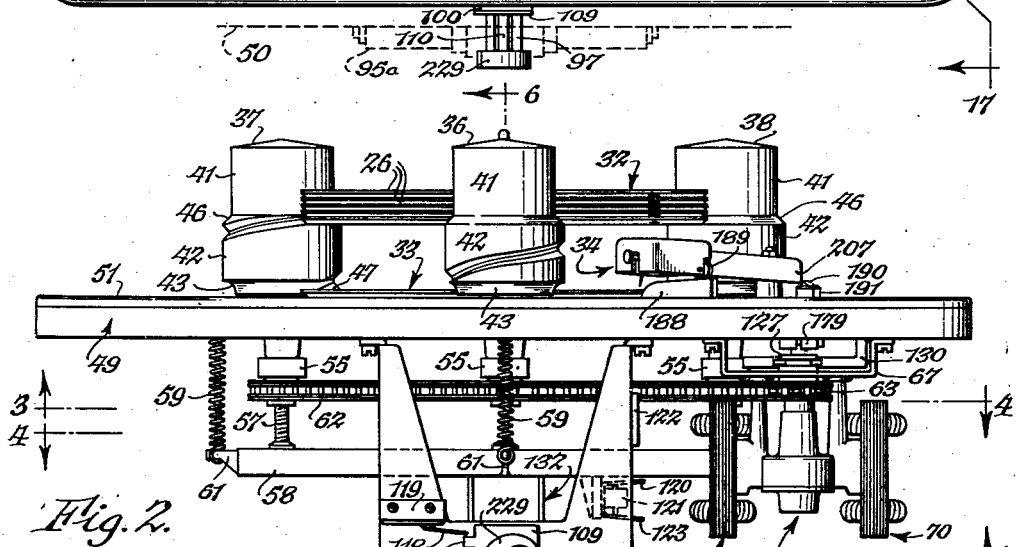
Figure 2 is a front elevation of the phonograph, portions only of the cabinet being shown.

The records to be played are indicated at 25 (Figures 1 and 13). As illustrated, they are carried by disc-like holders 26, preferably of sheet metal, having flaring marginal flanges 27 and centrally located openings 28 which register with the similarly located openings in the records, the tops and bottoms of the holders preferably being covered with layers of flock 29 to provide cushions for the records and insure the requisite degree of friction between them and their holders and the holders which seat upon them. The holders and their records are arranged upon the spindle 30 of the turntable 31, one above the other, in a two-part stack consisting of upper and lower parts 32 and 33, respectively, (Figure 2) which are spaced apart to permit the tone arm 34 to move between them during the playing of a record, the lower stack part being supported upon the turntable with the topmost record 35 occupying a playing position while the upper stack part is supported upon screws 36, 37 and 38. With the exception of the lowermost record 39 of the lower stack part and corresponding record 40 of the upper stack part, the holder of each record seats upon the record directly under it.

Figures 6, 7:
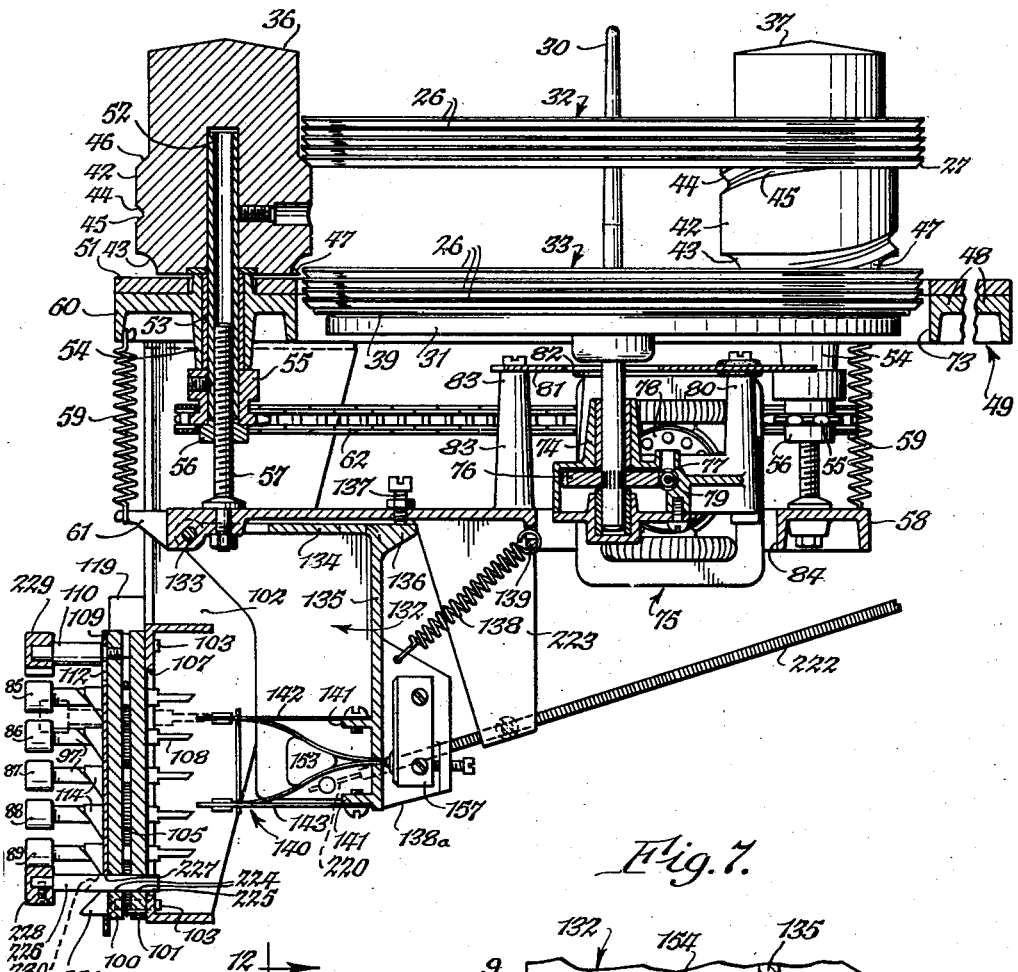
Figure 6 is an enlarged vertical section taken along line 6—6 of Figure 2.
Figure 7 is a similar view, further enlarged, but showing only certain of the selector elements and related parts of the selecting mechanism, one of the selector elements being illustrated in an operative position.

The screws 36, 37 and 38 are similar and may be of metal, plastic or any other suitable material. Each is in the form of a cylinder, has a neck 41 and is formed with a body portion 42 which overhangs a reduced base portion 43. A spiral groove 44 is formed in the body portion 42, the said groove traversing a total angular distance of 360° and having a lower wall 45 which is formed with a bevel corresponding to the angularity of the flanges 27 of the record holders. The pitch of the groove is predetermined so that the vertical distance between the terminal portions of the wall 45 corresponds to the distance which it is desired to maintain between the two parts of the record stack. At the upper end of the groove the wall 45 merges with an annular ledge 46 having the same bevel but of a uniform elevation while at the lower end the said wall is provided by a rib 47 (Figure 13) which is in the form of a thread and which takes a spiral path across the reduced base portion 43 and terminates at the lower edge thereof. The flange of the holder of the lowermost record of the upper stack part seats upon the innermost portions of the ledges 46 of the screws, thereby providing three points of support for the upper stack part. Preferably the screws are arranged in the triangular formation shown so that the points of support are spaced 120° apart, it being noted that the peripheries of the body portions of the screws overhang the stack part which is carried by the turntable and that the leading ends of the ribs 47 are located opposite and just above the rim portion of the flange of the second record from the top and below the corresponding portion of the flange of the holder of the topmost record (Figures 6 and 14).

The screws are carried by the top 48 of a supporting framework 49 which may be mounted in a cabinet of any desired ornamental appearance, the said cabinet, with the exception of a fragmentary portion of the front panel 50, being omitted for purposes of clarity. The top member 48, preferably being of metal, may, if desired, be provided with an ornamental surface by a sheet 51 of wood or other suitable material. Each of the screws 36, 37 and 38 is formed with an axial bore for accommodating the upper end of a spindle 52 (Figure 6) rotatably mounted in a vertically arranged sleeve-like bushing 53 which is carried by an annular boss 54 formed or provided upon the top frame member 48, the screws 36, 37, 38 being suitably fixed to the said spindles. A sprocket 55 is fixed to the lower end of each of the spindles. The latter carry internally threaded elements 56 which screw upon threaded posts 57 carried by a carriage 58, the weight of which is preferably counterbalanced by springs 59 which are connected at their upper ends to a marginal flange 60 on the under side of the top member 48 and at their lower ends to laterally extending arms 61. The carriage carries the turntable 31.

The sprockets 55 are connected by a chain 62 which is driven by a sprocket 63 (Figures 3 and 17) and which is maintained under the proper tension by a spring finger 62a, the sprocket 63 being fixed to a vertical drive shaft 64 of a motor driving unit 65 which is supported by posts 66 from a hanger 67 mounted upon the under side of the top frame member 48. The driven shaft 68 of the driving unit carries at one end the rotor 69a of a motor 69 (Figure 4) and at the opposite end the rotor 70a of a motor 70 and carries intermediate the said rotors a worm 71 (Figure 17) which meshes with a worm wheel 72 fixed to the drive shaft 64, the motor 69 being adapted, when energized, to rotate the drive shaft in one direction and the motor 70 being adapted, when energized, to rotate the drive shaft in the opposite direction.

It will be apparent that when the spindles 52 are driven in a clockwise direction the leading ends of the ribs 47 on the screws 36, 37 and 38 will move under the holder of the topmost record of the lower stack part and elevate it until it rests upon the ledges 46 of the screws and its record supports the records and holders of the upper stack part. In effecting the movement of the topmost record of the lower stack part to the lowermost position in the upper stack part the screws make one revolution. As the spindles 52 are rotated in the manner described the threaded elements 56 which are carried by the sprockets 55 rotate with the latter. The elements 56 are thus screwed further on the posts 57, thereby elevating the turntable 31. In other words, as the records are transferred from the lower stack part to the upper stack part the turntable is elevated a distance equivalent to the overall height or thickness of a record and its holder. Thus the topmost record of the lower stack part, regardless of the particular record, is always located at the same elevation and the distance between the stack parts is maintained constant.

Upon rotation of the spindles 52 in a counter-clockwise direction the screws 36, 37 and 38 are driven in a direction which will permit the record holders to ride off the ledges 46, down the spiral shoulders 45 and onto the topmost record of the lower stack part. The records are lowered one at a time as the turntable is simultaneously lowered so that as each record holder comes to rest upon the lower stack part it will be located at the same elevation as the preceding record holder. It will be apparent that as the screws rotate in the same direction the stack part supported by them and the record holder which may be in a stage of being transferred from one stack part to the other, as illustrated in Figure 13, will rotate with the screws. Hence wearing of the record holders and the screws is prevented. In order to avoid frictional noises which might otherwise occur as an incident to the raising and lowering of the record holders upon the turntable spindle, it is preferred that the upper end of the spindle be tapered. Although reference is made at various points herein to a "two-part" stack, it will be appreciated that when the topmost record of the upper stack part is supported upon the turntable the two stack parts become one. This, however, is true only with respect to the topmost record in the stack.

It will be noted (Figure 6) that the topmost record of the lower stack part is supported in a plane slightly above that of the surface of the top frame member 48 and that the remaining records of the said stack part and the turntable occupy an opening 73 formed in the top frame member. Hence, as records are transferred to the lower stack part the turntable moves further below the plane of the surface of the top frame member and as records are transferred to the upper stack part it moves closer to the plane of the surface of the said member.

The lower end of the turntable spindle is mounted in a bearing 74 in a motor drive unit 75 and carries a worm wheel 76 which meshes with a worm 77, the latter and a rotor 78 being carried by the driving shaft 79 of the unit. The drive unit is suspended by legs 80 from the under side of a disc-like plate 81 which is formed with an opening 82 for accommodating the turntable spindle and which is mounted upon posts 83 which are carried by the carriage 58, the said carriage being formed with an opening 84 through which the lower end of the motor drive unit extends. Means is thus provided for driving the turntable at any elevation to which the carriage may be adjusted. In this connection it is to be understood that preferably the entire weight of the carriage, the turntable and associated parts and the records of the lower stack part and their holders is carried by the springs 59. The posts 57, therefore, carry substantially none of the weight of these parts. They merely cooperate with the spindles 52 in adjusting the elevation of the carriage. The spindles thus rotate freely upon the posts 57 and require a minimum of power to effect the desired adjustment of the carriage. Moreover, as the carriage is adjusted to elevate the turntable, thereby reducing the tension upon the springs 59, records and their holders are transferred to the upper stack part; whereas when the carriage is adjusted to lower the turntable, thereby increasing the tension upon the said springs, records and their holders are transferred to the stack part upon the turntable. In other words, the load upon the springs is decreased as records are removed from the turntable and increased as records are added. The springs, therefore, provide floating supports for the carriage and no additional load is imposed upon the posts 57 and spindles 52 regardless of the number of records upon the turntable.

As noted heretofore, the topmost record of the lower stack part occupies a playing position and the topmost record is always located at the same elevation regardless of the number of records included in the said stack part. To the end that any record, whether it be included either in the upper or the lower stack part, may be moved to a playing position and played by the tone arm 34, mechanism is provided for selectively controlling the rotational movement of the screws 36, 37 and 38. The said means includes a plurality of manually operable selector elements 85, 86, 87, 88, 89, 90, 91, 92, 93 and 94 (Figure 2), there being one selector element for each record. The said elements are arranged in two vertical series, the elements in one series being staggered with relation to the elements in the companion series, and they project through a central opening 95 formed in an ornamental shield 95a which is mounted upon the front panel 50 of the cabinet of the machine. At the left side of the left series of selector elements the shield 95a is formed with a series of slots 96 in which may be arranged the names of the records with which the selector elements are identified. A similar series of slots for the same purpose is formed at the right side of the right series of selector elements.

The stems 97 of the selector elements are mounted for lengthwise movement in aligned openings 98 and 99 which are formed in companion plates 100 and 101, respectively, the said plates being mounted as a unit upon a depending bracket 102 which is supported from the underside of the top frame member 48. Collars 103 (Figure 12), which are carried by screws 104, hold the plates in spaced relation so that an elongated spring 105 may be accommodated between them, the said spring being under tension and being directed back and forth between the stems of the selector elements so that each of the said stems is engaged. The spring 105 offers a slight resistance to lengthwise movement of the stems and is normally adapted to hold the selector elements in an extended, inoperative position. However, when a selector element is pushed inwardly, and thereby rendered operative, it is adapted to hold the said element in such position. To this end each of the stems 97 is formed with an encircling groove 106 which the adjacent portion of the spring 105 enters as the selector element reaches the inner limit of its range of movement.

The plates 100 and 101 are mounted upon the bracket 102 by the screws 104. They support the selector elements so that their stems extend through an opening 107 (Figure 6) in the front wall of the bracket, the said stems carrying finger-like extensions 108 which have beveled ends. The selector element 90 (Figure 2) is operated to play the topmost record in the stack, the element 87 to play the second record, the element 85 to play the third record, the element 93 to play the fourth record, the element 91 to play the fifth record, the element 88 to play the sixth record, the element 86 to play the seventh record, the element 94 to play the eighth record, the element 92 to play the ninth record and the element 89 to play the tenth record. The records, of course, will be selected by the names which are identified with the selector elements and not with relation to their arrangement in the stack.

When a selector element is operated it actuates a plate 109. The latter is mounted upon the front of the plate 100 (Figure 6) by screws 110 and 111 (Figure 5) which extend through slots 112 and which serve as guide elements. Two series of openings 113 are formed in the plate 109 through which the stems of the selector elements pass, the metal removed in forming the said openings being utilized to provide projections 114 (Figures 6 and 7). The lower edges of the projections are undercut to provide camming edges 115. The latter are located in the path of beveled shoulders 116 which are formed on the stems of the selector elements so that when any one of the said elements is pushed inwardly the shoulder on its stem will ride under one of the projections on the plate and the plate will be moved upwardly.

The said plate is formed with a laterally extending arm 117 (Figure 5) which is located directly below the actuating spring lever 118 of a switch 119 and hence when the plate 109 is moved upwardly in the manner described the switch is closed, it being understood that the latter is adapted to be employed in conjunction with any suitable coin switch in such a manner that it will remain inoperative until the proper coin has been deposited in the coin slot provided for this purpose. The closing of the switch 119 energizes simultaneously the motor of the driving unit 75 for the turntable and one of the motors of the driving unit 65 which through the agency of the sprockets 55 and 63 and the chain 62 drives the spindles 52 to rotate the screws 36, 37 and 38, the direction of rotation of the screws depending upon which of the motors 69 and 70 is energized. One of the motors 69 and 70 is operative to rotate the screws in a clockwise direction and simultaneously elevate the turntable to a height at which it supports the lowermost record of the lower stack part in a playing position while the other motor is operative to rotate the screws in a counterclockwise direction and simultaneously lower the turntable to a height at which it supports the topmost record of the upper stack part in a playing position. These two positions of the turntable are the upper and lower limits of its range of movement. Thus, assuming that the motor 69 is energized and that the carriage 58 is moving the turntable upwardly while the screws are rotating in a clockwise direction, when the upper limit is reached an actuating arm 120 (Figure 2) of a reversing switch 121 which is mounted upon the carriage engages a bar 122 carried by the bracket 102 and is depressed to deenergize the motor 69 and energize the motor 70. Thereupon the latter is operative to move the carriage, and hence the turntable, downwardly while the screws rotate in a counterclockwise direction. When the lower limit is reached an arm 123 of the reversing switch 121 engages a bar 124 which is carried by the bracket 102, thereby deenergizing the motor 70 and energizing the motor 69.

Figure 20:
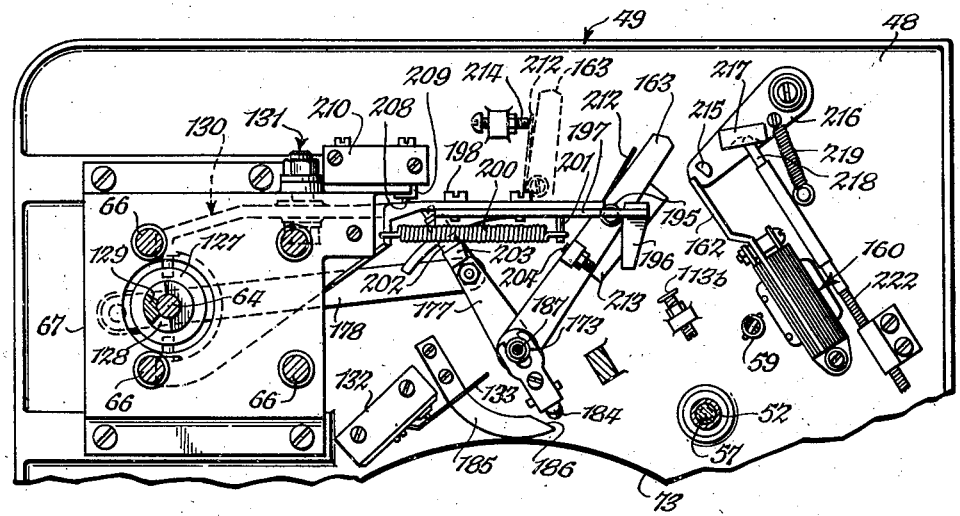
Figure 20 is a horizontal section similar to Figure 3, the parts being shown in the same positions as in Figure 18.

The sprocket 63 is loosely mounted on the shaft 64 (Figure 17) of the motor drive unit 65, being held against axial movement by a key 125 which is carried by the sprocket and which moves in an annular groove 126 formed in the shaft. The sprocket, therefore, is operative to drive the chain 62 to rotate the screws 36, 37 and 38 in the manner described only when it is connected to the shaft 64 by a clutch member 127 which is splined to the shaft 64, the upper face of the sprocket being formed to provide a sector-like jaw 128 which cooperates with a similar jaw 129 formed on the clutch member 127. Preferably the angular extent of the jaw 128 is substantially less than that of the jaw 129, as best shown in Figure 20. As a result interfitting of the jaws throughout a predetermined range is thus insured and a certain degree of lost motion provided. The clutch member 127 is splined upon the shaft 64 and it is actuated by a lever 130 which is pivotally mounted upon a trunnion 131 carried by a side wall of the hanger 67, the said lever having a forked end which embraces the clutch member 127 in such a manner as to permit it to rotate freely with the shaft 64.

A spring 131a is mounted upon the bottom plate of the hanger 67 and acts against the lever 130 to normally hold the clutch member 127 in engagement with the sprocket 63. Hence, upon closing of the switch 119 by the operation of one of the selector elements, the motor drive unit 65 is energized and the screws 36, 37 and 38 are rotated to transfer records from one stack part to the other in the manner described. The selector element which is operated is also adapted to effect the release of the clutch member 127 when the selected record has been moved to a playing position. To this end the carriage 58 carries a depending bracket 132 (Figure 6) which is pivotally mounted upon the underside of the carriage upon a rod 133. The said bracket is formed with a top wall 134 and a vertical rear wall 135, the former having an extension 136 which is normally held against an adjustable stop 137 by a spring 138, one end of which is connected to a rearwardly extending plate 138a carried by the bracket 132 and the other end of which is connected to the flange 139 which delimits the opening 84 in the carriage 58.

Figure 23:
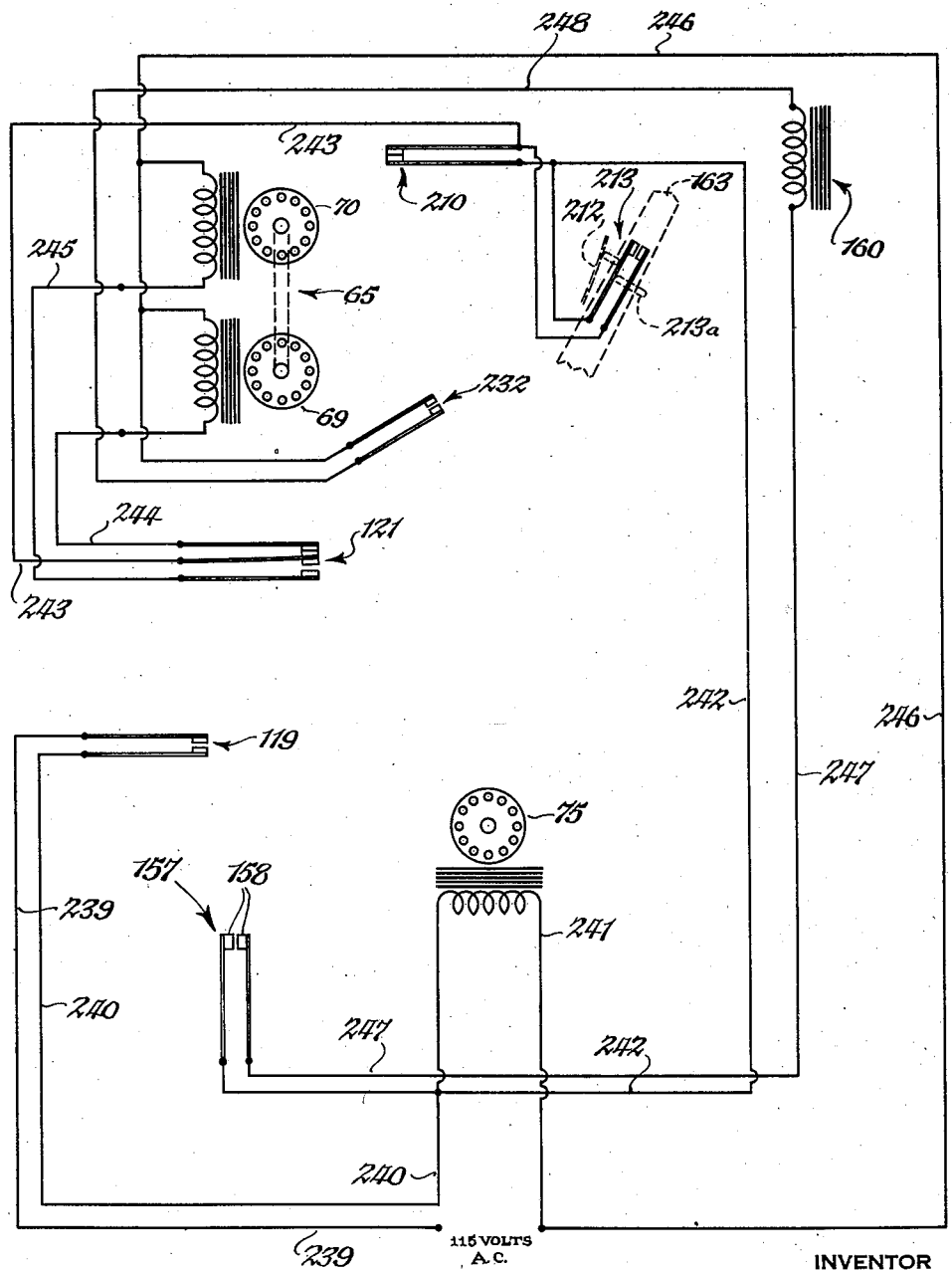
Figure 23 is a circuit diagram.

A switch actuating device 140 is mounted upon spaced ribs 141 which are formed at the lower end of the bracket 132 upon the rear wall 135. The said device includes upper and lower spring-metal strips 142 and 143, respectively, the inner ends of the said strips being suitably secured to the ribs 141. At their outer free ends the two strips are connected by a bridge-piece 144 (Figure 9) which is in the shape of the letter H, the ends of the vertical bars of the bridge-piece extending through openings 145 in the strips 142 and 143 and being notched as at 146 to accommodate the marginal edges of the metal surrounding the openings. To insert the ends of the vertical bars of the bridge-piece through the opening 145 in the strips the bridge-piece may be temporarily flexed, as indicated in dotted lines in Figure 10. Outwardly of the bridge-piece 144 each of the strips carries upper and lower crossbars 147. The latter are set back from the terminal portions 148 of the strips and provide upper and lower shoulders on each of the strips. The upper strip 142 carries a resilient tongue 150 while the lower strip 143 carries a similar tongue 151. The two tongues are preferably stamped from their respective strips, being attached to the latter by unsevered hinge portions 152 (Figure 10). The upper tongue is bent downwardly over the upper side of a guide head 153 which is mounted upon the side wall 154 of the bracket 132 and extends through a slot 155 formed in the rear wall 135. The lower tongue is bent upwardly against the under side of the guide head 153 and also extends through the slot 155, the upper and under sides of the said head preferably being slightly concave, as illustrated. The free ends of the tongues 150 and 151 terminate in abutting relation with respect to the actuating button 156 of a conventional microswitch 157 which is mounted upon the plate 138a, the said switch including a pair of normally open contacts 158 (Figure 23).

From the foregoing it will be apparent, assuming that the selector element 91 has been operated, as shown in Figure 7, and that the closing of the switch 119 has energized the motor 70 so that as the screws 36, 37 and 38 rotate the carriage 50 moves downwardly, that as the terminal portion 146 of the upper strip 142 engages the upper side of the extension 108 of the selector element, the terminal portions of both strips will be deflected slightly upwardly, thereby causing the tongue 151 of the lower strip to be extended through the slot 155 to actuate the switch 157. On the other hand, when the terminal portions of the strips are deflected in the opposite direction, as will be the case when the carriage is moving upwardly so that the under side of the extension 108 is engaged, the upper tongue will be extended to actuate the switch.

Referring to Figure 10 it will be noted that the strips 142 and 143 of the actuating device 140 are supported so that the extensions 108 of the stems of both series of selector elements will, when the said elements are operated, project into the path traversed by the terminal portions of the strips as the carriage moves between its upper and lower limits. As noted heretofore, the selector elements of one series are mounted in staggered relation with respect to those of the companion series. This is likewise true of the extensions 108 carried by the stems of the elements. In accordance with the invention the strips 142 and 143 of the actuating device 140 are supported in such spaced relation that, assuming that the terminal portion of the upper strip is located at an elevation corresponding to that of the upper side of the extension 108 of the topmost selector element 90, the terminal portion of the lower strip will be located midway between the extensions carried by the selector elements 92 and 87. When the strips 142 and 143 are supported in this relation to the selector elements, the carriage 50 is at the upper limit of its range of movement. Hence, during its downward movement, assuming that all of the selector elements have been operated, the switch actuating device 140 will move into engagement with the extensions of the selector elements in the following order: 90, 87, 85, 93, 91, 88, 86, 94, 92 and 89, the terminal portion of the upper strip being located midway between the extensions of the selector elements 92 and 87 when the terminal portion of the lower strip engages the extension of the selector element 89, which will occur when the carriage reaches the lower limit of its range of movement. In other words, the extensions of the selector elements are engaged alternately by the upper and lower strips of the actuating device, regardless of which direction the carriage is moving, and the switch 157 is closed each time that this occurs. The strips are thin. The beveling of the ends of the extensions of the selector elements, therefore, precludes the possibility of the extensions being engaged by the ends of the strips in such a manner as to prevent the selector elements from being moved to an operative position. Thus, if one of the strips should be located directly opposite the extension of a selector element when the latter is operated, the beveled end of the extensions will engage the end of the strip and cause it to be deflected slightly, thereby closing the switch 157. The use of an actuating device of the character described in connection with the staggered arrangement of selector elements insures the provision of ample space to conveniently accommodate the desired number of elements without crowding of the elements or requiring unnecessary limitations as to their size, design or arrangement.

Figure 22:
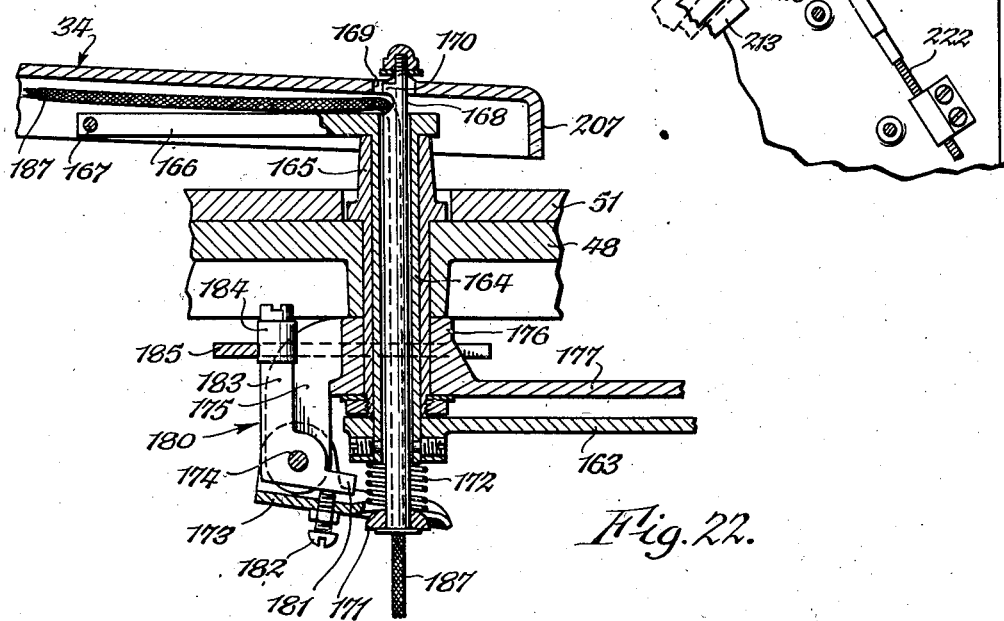
Figure 22 is a vertical section taken along line 22—22 of Figure 3.

When the switch 157 is actuated in the manner described the contacts 158 (Figure 23) are closed and a solenoid 160 (Figure 17) is energized. The said solenoid is mounted upon the under side of the top frame member 48. An armature 161, which is pivotally mounted in cooperating relation with the solenoid, includes a latch extension 162, the armature being biased by a spring 162a so that the latch normally assumes a position in which it engages the outer end of an arm 163. The latter is fixed to the lower end of a sleeve 164 (Figure 22) which is journaled in a sleeve-like bushing 165 carried by the top frame member 48, the upper end of the sleeve 164 carrying an arm 166 which is located within the channel of the tone arm 34 and which carries a pin 167 upon which the tone arm is mounted. Adjacent its inner end the tone arm is connected to the upper end of a hollow stem 168, the top wall of the tone arm being formed with a slot 169 to accommodate a key 170 adapted to prevent relative angular movement between the tone arm and stem. At its lower end the stem 168 carries a collar 171. A spring 172 which is arranged under compression upon the stem 168 between the hub on the arm 163 and the collar 171 is adapted to counterbalance a part of the weight of the outer end of the tone arm, whereby to insure resting of the needle of the tone arm upon the record being played with the proper pressure. The forked end of a lever 173 seats upon the collar 171. The said lever is pivotally supported upon a pin 174 which is mounted between the lower ends of depending extensions 175. The latter are carried by a hub 176 which is journaled upon the lower end of the bushing 165 and which carries a drive arm 177 (Figures 17 and 18), the outer end of which is connected by a link 178 to a crank 179 fixed to the upper end of the drive shaft 64.

The pin 174 carries a rock member 180, a laterally extending arm 181 of which engages an adjustable element 182 carried by the lever 173. The rock member also includes a vertical arm 183 which carries a roller 184. The latter engages an arcuate track-piece 185 which is supported from and in spaced relation with respect to the under side of the top frame member 48 and which is formed with a beveled end 186 (Figure 20). The track-piece 185 is so formed that when the roller 184 engages its arcuate portion the lever 173 is held in a position in which it engages the collar 171 on the stem 168 to hold the tone arm so that the needle is elevated with respect to its playing position. In this connection it will be noted that the stem 168 serves as a housing for the wires 187 which connect the electrical pickup to power. In the inoperative position of the tone arm, the outer end is located at one side of the opening 73 in the top frame member 48 and rests at the top of an inclined shoulder 188, a roller 189 which is mounted upon the outer end of the tone arm being adapted to ride upon the said shoulder. When the outer end of the tone arm is supported upon the shoulder 188, the inner end is located in spaced relation with respect to a stop 190. The latter is in the form of a plunger and is arranged in a socket 191 (Figure 19) formed or provided upon the top frame member 48. The stop is held in its socket by a pin 192 which cooperates with the walls of a recess 193 to provide the upper and lower limits of its range of movement, a spring 194 which is located in the socket serving to normally hold the stop at the upper limit.

Figure 17:
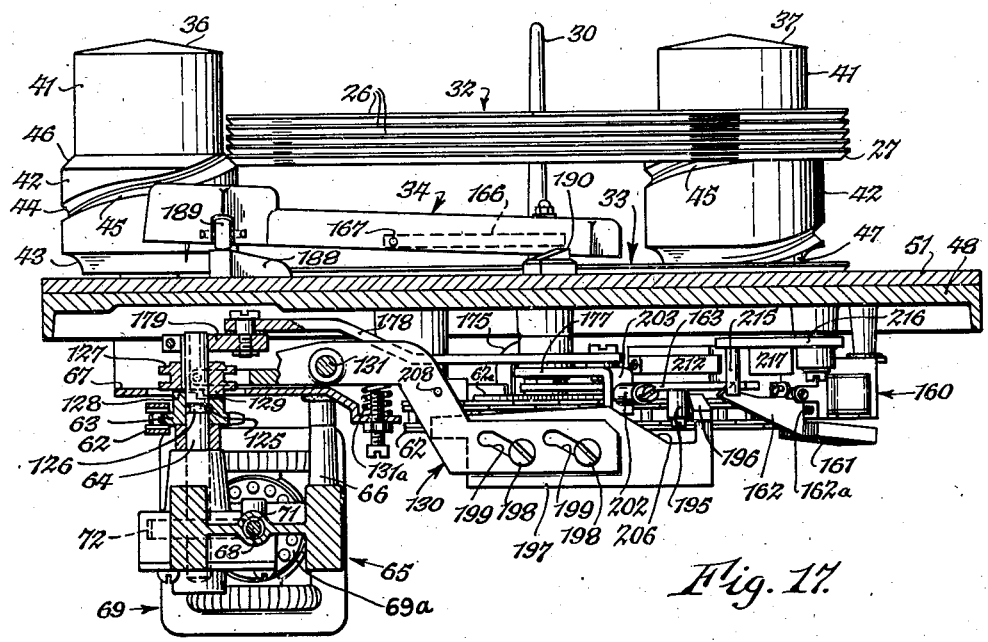
Figure 17 is a vertical section taken along line 17—17 of Figure 1, the parts being shown in the same positions as in Figure 3.
Figure 18:
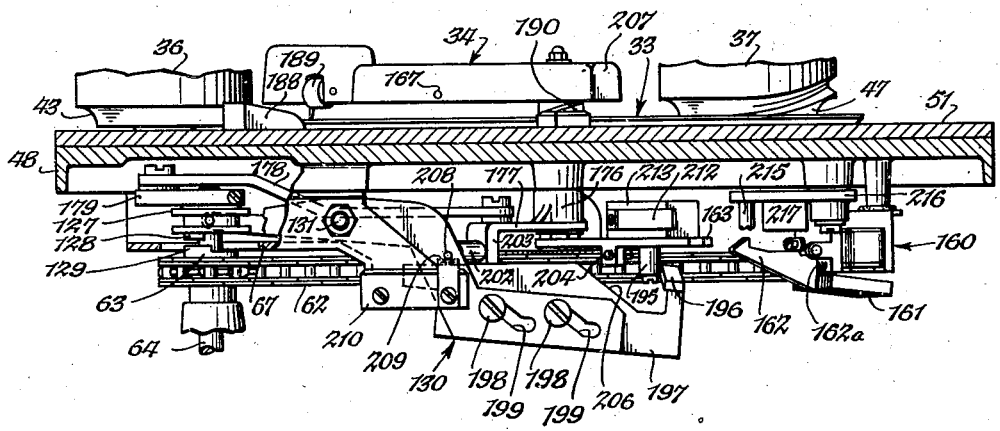
Figure 18 is a similar section, the parts being shown in record playing positions.

Referring to Figures 17 and 18, it will be noted that the arm 163 carries a depending roller 195. In the latched position of the arm the roller engages a cross-piece 196 which is formed or provided upon a plate 197, the said plate being carried by the clutch actuating lever 130. The mounting of the plate upon the lever is effected by screws 198 which are carried by the plate and which extend through slots 199 formed in the lever. The slots have angularly inclined central portions and substantially horizontal terminal portions. A spring 200 (Figures 3 and 20) is connected at one end to a pin 201 on the plate 197 and at its opposite end to the lever 130. The said spring biases the plate 197 toward a position in which the screws 198 occupy the forward upper limits of the slots 199 but in the latched position of the arm 163 the plate is held in the position in which the screws 198 occupy the rearward lower limits of the slots 199, as best shown in Figure 17. Hence, as the records are transferred from one stack part to the other and the elevation of the carriage is adjusted, the arm 177 oscillates between the two limits of its range of movement and a roller 202 which is carried by a depending end 203 moves back and forth above the upper edge of the plate 197.

The parts are so timed that at the instant the solenoid 160 is energized to actuate the latch 162 to release the lever 163 an adjustable element 204 (Figure 3) which is carried by the arm 163 abuts the depending end 203 formed or provided upon the arm 177. Upon release of the arm 163 the spring 200 advances the plate 197 in the direction of the pivot upon which the lever 130 is mounted. The said plate, however, can move only so fast as permitted by the arm 163 and the latter can move only so fast as permitted by the arm 177. As the plate 197 is advanced in the manner described the screws 198 ride up the slots 199 and it is thereby elevated above the roller 202. During this interval the plate 197 and the arms 177 and 163 move ahead as a unit, the roller 202 on the arm 177 following behind an inclined shoulder 206 on the plate. However, as the screws 198 reach the upper limits of the slots 199 the forward movement of the plate is arrested. The arm 177 continues its forward movement and as the roller 202 engages the shoulder 206 it depresses the plate to thereby rock the lever 130 upon its pivot against the action of the spring 131a and disengage the clutch member 127. Such disengagement occurs as the roller 202 approaches the peak portion of the inclined shoulder 206, as the holder of the selected record reaches a playing position and as the screws 36, 37 and 38 reach angular positions in which the leading ends of the ribs 47 are located substantially at the edge of the opening 73 and slightly in arrear of the positions at which they engage and move under the flange of the said holder.

Figure 19:
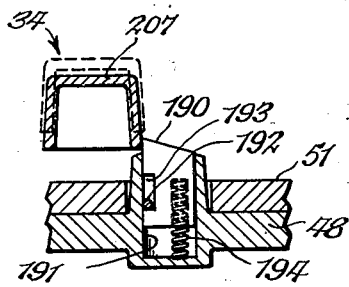
Figure 19 is an enlarged detail section taken along line 19—19 of Figure 1.

As the arm 163 follows the arm 177 during the forward movement of the latter the tone arm 34 is moved down off the shoulder 188 to a position over, but above, the record to be played, the tone arm being arrested when the needle is located above the sound groove by the engagement of the tail end 207 of the tone arm with the stop 190, as best shown in Figure 19. During this part of the travel of the tone arm the needle is held in the elevated position described by the engagement of the roller 184 (Figure 22) with the track-piece 185. However, as the tone arm reaches the limit fixed by the stop 190 and the clutch member 127 is disengaged, the roller 184 passes beyond the arcuate portion of the track-piece and permits the tone arm to lower the needle upon the record as the roller rides over the beveled end 186 (Figure 20) of the track-piece, the parts being so timed that the lowering of the needle upon the record is effected after disengagement of the clutch member 127 and during the subsequent coasting movement of the arm 177 as the roller 202 rides along the straight upper edge of the plate 197. The driving motor 75 of the turntable having been energized with the closing of the switch 119, playing of the selected record begins as soon as the needle is lowered upon it.

Simultaneously with the disengagement of the clutch member 127, the circuit of the particular motor of the drive unit 65 which is energized is broken. For this purpose the clutch actuating lever 130 carries a pin 208 (Figure 18). The latter is located above a resilient operating member 209 of a normally closed micro-switch 210 and is adapted, when the lever 130 is actuated to disengage the clutch member 127, to open the switch 210 and hold it open so long as the clutch member remains disengaged, it being immaterial which of the motors 69 and 70 happens to be energized at the time the clutch member is released.

As the tone arm lowers the needle upon the record the tail end 207 (Figure 19) moves from the full-line position to the dotted line position. Hence, during playing of the record the tail end of the tone arm is free to move across the stop 190 and the arm 163, being clear of all parts of the clutch actuating mechanism, is free to float unhindered as it moves with the tone arm. Upon completion of the playing of the record the needle enters the spiral oscillating groove 211 (Figure 1) to which the sound groove leads and the tone arm is further advanced to a position in which the resilient actuating member 212 (Figure 20) of a micro-switch 213 engages a stop 214 on the underside of the top frame member 48, the resilient actuating member and the switch both being carried by the arm 163. Thereupon the switch 213 is closed to connect the motors 69 and 70 of the drive unit 65 around the switch 210. The motor of the unit 65 which is energized drives the shaft 64 and the latter is operative through the agency of the crank 179, link 178 and arm 177 to restore the parts to their original positions, that is to say, the positions shown in Figure 17. During the initial part of such movement of the arm 177, the roller 184 (Figure 20) moves across the beveled end of the track-piece 185 to elevate the tone arm and thereby lift the needle off the record. There-after the depending end of the arm 177 (Figure 3) engages the element 204 carried by the arm 163 and the arm 177 drives the arm 163 ahead of it as the roller 202 rides along the top edge of the plate 197. As the two arms move in this manner the roller 202 passes beyond the inclined shoulder 206 on the plate and the roller 195 on the arm 163 engages the cross-piece 196 (Figure 18) of the plate and the latter is carried along with the two arms against the action of the spring 200. The plate, however, moves downwardly as the screws 198 follow the slots 199, thereby permitting the spring 131a to move the lever 130 toward a position in which the clutch member 127 again engages the sprocket 63. The establishing of the driving connection for the sprocket is not instantaneous. At the instant that the circuit for the motors of the drive unit 65 is closed by closing of the switch 213 the projecting portion of the clutch member 127 is located over the corresponding portion of the sprocket 63 and the clutch member is held in spaced relation with respect to the sprocket by the engagement of the roller 202 with the straight edge of the plate 197, it being noted that when the clutch member was originally disengaged its elevated portion was carried to the position described during the coasting movement of the arm 177. Hence, as the shaft 64 starts to rotate the arm 177 is started on its return movement. During the initial part of such movement the roller 202 rides along the straight edge of the plate 197 and the projecting portion of clutch member 127 moves to a position over the cut-away portion of the sprocket 63. This occurs as the roller 202 rides down the inclined portion 206 of the plate 197 to thereby permit the spring 131a to actuate the lever 130 to cause the projecting portion on the clutch member to enter the cut-away portion in the sprocket. After meshing of the jaws of the clutch member and sprocket, but before the lost motion between the two is taken up, the driving member 177 completes its rearward stroke, during the final part of which the arm 163 is moved behind the latch 162 as the tone arm moves upon the shoulder 188, the tail end 207 of the tone arm depressing the stop 190 as it passes over the latter to its original position and an actuating button 213a (Figure 3) of the switch 213 (carried by the arm 163) engaging a stop 213b to open the said switch.

Figure 21:
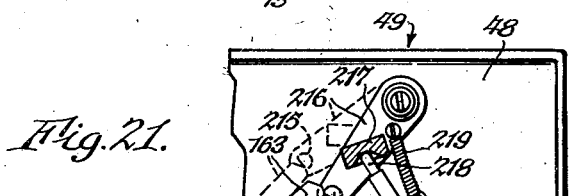
Figure 21 is a detail sectional view of the cancelling mechanism.

As the arm 163 passes behind the latch 162 the outer end of the former engages a pin 215 (Figure 21) which is carried by an arm 216. The latter is pivotally mounted upon the underside of the top frame member 48 and carries a recessed shoulder 217 which abuts a plunger 218, the shoulder being held against the plunger by a spring 219. The plunger 218 is connected to one end of a wire 220 (Figure 10), the other end of the wire being connected to a boss 221 formed or provided upon the side wall 154 of the bracket 132. The wire may be housed in a flexible cable 222 which is suitably secured to the top frame member and to a depending bracket 223 (Figure 6) supported from the underside of the carriage 58. The actuation of the plunger rocks the bracket 132 upon the carriage and the selector element which has initiated the cycle of operations described is restored to its original position by one of the cross-bars 147 on the engaged strip of the switch actuating device 149. When the end of the arm 163 moves beyond the pin 215 the latter is released and the spring 138 (Figure 6) is operative to restore the bracket 132, wire 220 and plunger 218 to their original positions. The switch actuating device being thereby released, the switch 157 assumes its normally open position and the circuit of the solenoid 160 is broken to permit the latch 162 to engage the arm 163 before the start of the succeeding forward stroke of the arm 177.

It will thus be apparent that as the arm 177 restores the tone arm to its original position, the clutch member 127 is again in driving engagement with the sprocket 63 with substantially the same degree of lost motion, or clearance, between the leading and trailing shoulders of the projecting portion on the clutch member and the cooperating shoulders of the projecting portion of the sprocket; the arm 163 is engaged by the latch 162; and the circuit of the solenoid 160 is open. If at this time there are no other selector elements which have been operated, the plate 109 (Figure 5) falls by gravity and pressure of the spring lever 118 to its original position and the switch 119 is opened, thereby to open all circuits. If, however, one or more selector elements occupy operative positions, the switch 119 will remain closed and current will be supplied to the motors of the two driving units. The screws 36, 37 and 38 will, therefore, be driven simultaneously with the carriage 58 until another selector element is engaged, thereby initiating the cycle of operations which are performed in the playing of the record with which the said element is identified. When the final record has been played, the plate 109 drops to open the switch 119 and all circuits are broken.

The stopping of the machine with lost motion provided between the jaws of the clutch and sprocket prevents the full load from being applied to the driving motor 69 or 70, as the case may be, until the motor has attained substantial speed. This permits the use of motors having low starting torque.

If desired selections which have been made may be cancelled. To this end aligned openings 224 (Figure 6) may be formed in the plates 100 and 101 below the series of openings 113. The openings 224 provide guideways for the stem 225 of an element 226, the said stem passing through an opening 227 in the plate 109 and having a head 228. The latter is preferably of an ornamental shape which will cooperate with a similar head 229 carried by the screw 110 and the heads of the selector elements to present a symmetrical and pleasing ornamental pattern. The stem of the element 226 is formed with a shoulder 230 which is inclined in a direction opposite to the shoulders 116 on the selector elements and which cooperates with a beveled projection 231 which is formed on the plate 109. The element 226 is adapted when operated to move the plate 109 downwardly, the projections 114 on the plate acting upon the shoulders 116 on the stems of the selector elements which have been operated to restore them to an inoperative position. It is understood, of course, that a suitable lock mechanism may be employed in conjunction with the cancelling element so that the latter may not be operated during the playing of a record, or if it is operated, it will become effective only upon completion of the playing of the record.

Figure 3:
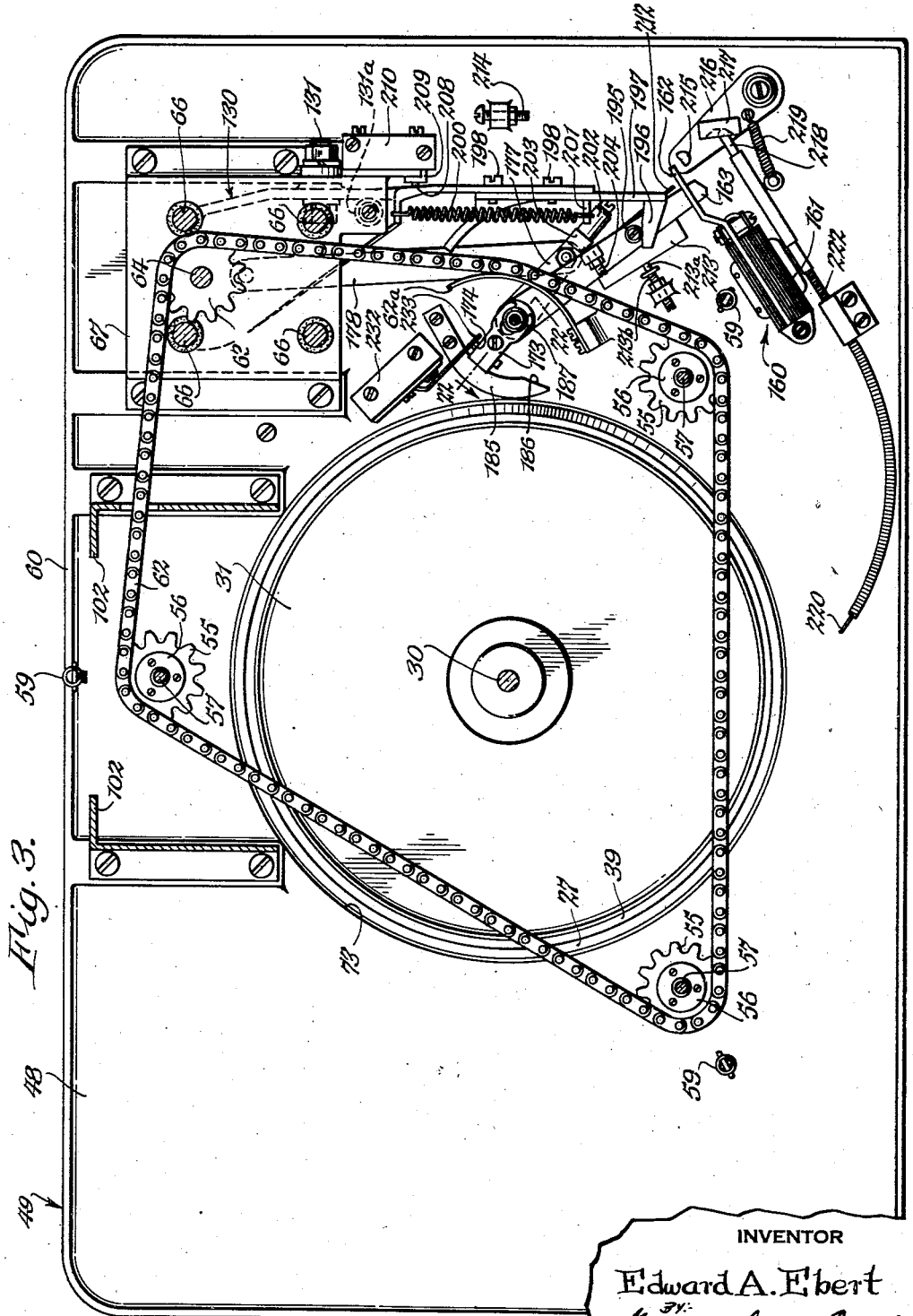
Figure 3 is a horizontal section taken along line 3—3 of Figure 2.

It will be noted that the circuit of the solenoid 160 includes a normally open micro-switch 232 (Figure 3). The latter is in series with the switch 157, is mounted upon the underside of the top frame member 58 at one side of the track-piece 185 and is provided with a resilient actuating member 233 which extends below and across the track-piece in the path of one end of the pivot pin 173. The switch 232 is closed in the latched position of the arm 163 and the actuating member 233 permits it to remain closed during the initial part of the movement of the said arm to move the tone arm to an operative position. Escape of the arm 163 from the latching member 162 is thus insured, the switch being again closed upon completion of the playing of the record and in advance of the interval during which the said arm is moving across the latch preparatory to being engaged. It will be apparent that the solenoid will be deenergized during the playing of a record since at such time the switch 232 will be open. The switch 232 being included in the circuit for the solenoid 160 insures that the said circuit will be closed, and hence that the latch 162 will be operated to release the arm 163, at the instant the latter is at the limit of its return movement regardless of slight variations in the spacing of, or the thickness of, the extensions 108 of the selector elements. In this connection it is preferred that the said extensions be slightly oversize (with respect to thickness). Operation of the switch 157 in advance of the switch 232 is thus insured, thereby preventing early or late release of the arm 163 and insuring smooth operation of the parts.

Modified forms of record holders are indicated at 26a in Figure 15 and 26b in Figure 16. The holders 26a are preferably of metal and are formed with flaring rims 234 which carry inturned flanges 235, the said flanges being so formed that each holder is adapted to seat upon the flange of the holder under it. The holders 26b are preferably molded from a plastic material and are formed with flaring rims 236 which extend above and below their bodies 237 and which nest so that the records are individually supported. The bodies 237 may, as shown, be formed with openings 238 of any desired shape and arrangement to lighten the holders. It will be noted that in each embodiment the holders seat upon one another as distinguishing from the construction shown in Figure 13 wherein the holders set upon the records. This has the advantage that warping of the records does not alter, or otherwise influence, the arrangement of the holders in the stack parts. Cooperation of the screws 36, 37 and 38 with the edges of the holders in the desired manner is thereby insured regardless of the condition of the records.

Referring to the wiring diagram (Figure 23), it will be noted that one side of the switch 119 is connected by a wire 239 to one side of a source of power which may be alternating current of 115 volts. The other side of the said switch is connected by a wire 240 to one side of the motor 75, the other side of which is connected by a wire 241 to the other side of the source of power. A wire 242 which is connected to the wire 240 leads to one side of the switch 210, the other side of the said switch being connected to a wire 243 which leads to the central terminal on the reversing switch 121. One terminal of the reversing switch is connected by a wire 244 to one side of the motor 69 while the other terminal is connected by a wire 245 to one side of the motor 70, each of the motors having one side connected to a wire 246. The wire 242 is connected to the right hand terminal of the switch 157. The other terminal of the latter is connected by a wire 247 to one side of the solenoid 160, the other side of which is connected by a wire 248 and switch 282 to the line 246.

It will thus be apparent that when a selector element is operated the switch 119 will be closed, thereby closing the circuit of the motor 75 and the circuit of one of the motor 69 and 70, the latter circuit including wire 239 to one side of the line, switch 119, wire 240, switch 210, wire 243, central terminal of switch 121, one of the other terminals of the said switch to one side of one of the motors 69 and 70 and the other side of the said motor to wire 246 to the other side of the line. The screws 36, 37 and 38 are thereupon driven to transfer records from one stack part to the other as the carriage is adjusted vertically to correct the elevation of the turntable correspondingly. As the selected record approaches a playing position the switch 157 is closed by the operation of the switch actuating device 140 by the extension of the selector element which is located in its path, the closing of the said switch closing the solenoid circuit, which also includes the closed switch 232, to actuate the latch 162 and release the arm 163 which controls the movement of the tone arm. After the arm 163 moves a short distance from its latched position the switch 232 is opened to break the circuit of the solenoid 160 and after the tone arm has been moved to the starting position over the record the clutch member 127 of the motor drive unit is released and simultaneously the switch 210 is opened to break the circuit which furnishes current to the motors 69 and 70. After release of the clutch member 127, the arm 177 coasts a short distance to lower the needle of the tone arm upon the record. The motor 75 being energized at this time, playing of the record begins immediately. Upon completion of the playing of the record the needle enters the oscillating portion 211 of the groove and the arm 163 is moved to a position in which the switch 213 is closed, thereby closing the circuit furnishing current to the motor of the drive unit 65. The driving arm 177 is thereupon actuated to permit the switch 210 to close, to restore the tone arm to its original position, after first lifting it off the record, and to cancel the selector element instrumental in initiating the cycle of operations described, the switch 232 being closed and the switch 213 being opened as the arm 163 approaches its latched position and the switch 157 being opened upon freeing of the switch actuating device 140. The switch 119, however, remains closed so long as any of the selector elements remain in their operative positions. Hence, after one record has been played and after the arm 163 has been restored to its latched position, assuming that there are other selections to be played, the screws 36, 37 and 38 immediately start to transfer records from one stack part to the other as the elevation of the turntable is corrected until the switch actuating device 140 is again operated by one of the selector elements, thereby beginning anew the sequence of operations described. The playing of the records proceeds automatically until completion of the final selection. The cancelling of the selector elements identified with this selection releases the plate 109 and the latter drops to open the switch 119.

In connection with the foregoing it will be noted that upon completion of the playing of a record, the latter is not restored to its original position in the stack but remains in a playing position; nor are the screws 36, 37 and 38, carriage 58 and associated parts restored to their original positions. These parts remain in the positions occupied upon completion of the playing of the record and the sequence of operations which are performed in the playing of a succeeding record begins where the preceding sequence left off. This has the advantage that the movement of the parts is reduced to a minimum, time is reduced between the playing of successive records and the repeated playing of the same record involves no movement whatever of the record transferring screws, turntable carriage or associated parts.

The switch actuating device 140 provides a direct mechanical connection between the selector elements and the switch 157. Positive control of the latter is thus insured. In connection with the switch 157 and the various other switches referred to as "micro-switches" it is to be understood that the term used is merely to designate any form of conventional switch having a low movement differential, this type of switch being preferred as it enables the timing of the various mechanisms to be more accurately adjusted than would otherwise be possible.

Although providing a mechanical connection between the selector elements and the switch 157 any damage to the selector elements or the actuating device 140 as a result of failure of the switch or jamming of the parts of the driving mechanism is rendered impossible by the inherent resiliency of the actuating device. For example, assuming that the carriage 58 moves downwardly and that the upper strip 142 of the said device engages the extension of the selector element 91, as shown in Figure 7, but that for some reason the downward movement of the carriage is not arrested, then instead of a normal flexing of the device the degree of flexing will be increased as shown in Figure 11 and continue to increase to a degree which will permit the terminal portion of the strip 142 to pass the extension of the selector element. Such excessive flexing of the strips of the actuating device does not permanently deform them and does not increase in any substantial measure the pressure which the tongues 150 and 151 apply to the button 156 of the switch 157 as the tongues, instead of following the curvature of the head 153, as they do under normal conditions, are deflected away from the head. Any injury to the switch 157 or the actuating device as a result of abnormal deflection of the said device is thus avoided.

I claim as my invention:

1. An automatic phonograph comprising a tone arm, a plurality of record discs arranged one above the other to provide upper and lower stack parts between which the tone arm travels to play the topmost record of the lower stack part, means for rotatably supporting the lower stack part, screws which are engageable with the peripheral edges of said discs one at a time and which support the upper stack part, said screws having threads leading from the uppermost record disc of the lower stack part to the lowermost record disc of the upper stack part and being rotatable to transfer discs from one stack part to the other, means for driving said screws and means for selectively controlling the operation of said last named means.

2. An automatic phonograph comprising a tone arm, a plurality of record discs arranged one above the other to provide upper and lower stack parts between which the tone arm travels to play the topmost record of the lower stack part, means for rotatably supporting the lower stack part, screws which are engageable with the peripheral edges of said discs, which support the upper stack part and which are rotatable to transfer discs from one stack part to the other, means for driving said screws in opposite directions and means for selectively controlling the operation of said last named means.

3. An automatic phonograph comprising a tone arm, a plurality of record discs arranged one above the other to provide upper and lower stack parts between which the tone arm travels to play the topmost record of the lower stack part, means for rotatably supporting the lower stack part, screws which are engageable with the peripheral edges of said discs one at a time and which support the upper stack part, said screws having threads leading from the uppermost record disc of the lower stack part to the lowermost record disc of the upper stack part and being rotatable in opposite directions to transfer record discs from each of said stack parts to the other, means for driving said screws in opposite directions and means for selectively controlling the operation of said last named means.

4. An automatic phonograph comprising a tone arm, a plurality of record discs arranged one above the other to provide upper and lower stack parts between which the tone arm travels to play the topmost record of the lower stack part, a turntable upon which the lower stack part is supported, means for rotating said turntable, screws which are engageable with the peripheral edges of said discs one at a time and which support the upper stack part, said screws having threads leading from the uppermost record disc of the lower stack part to the lowermost record disc of the upper stack part and being rotatable in opposite directions to transfer record discs from each of said stack parts to the other, means for rotating said screws in opposite directions, means driven by said last named means for adjusting the elevation of said turntable to variable and predetermined positions as record discs are added to or removed from the lower stack part, whereby each record is played at the same elevation and means for selectively controlling the operation of the foregoing means.

5. An automatic phonograph comprising a tone arm, a plurality of record discs arranged one above the other to provide upper and lower stack parts between which the tone arm travels to play the topmost record of the lower stack part, a turntable upon which the lower stack part is supported, means for rotating said turntable, screws which are engageable with the peripheral edges of said discs one at a time and which support the upper stack part, said screws having threads leading from the uppermost record disc of the lower stack part to the lowermost record disc of the upper stack part, and being rotatable in opposite directions to transfer record discs from each of said stack parts to the other, means for elevating said turntable to variable and predetermined positions as discs are transferred from the lower stack part to the upper and for similarly lowering the turntable as discs are transferred from the upper stack part to the lower, whereby each record is played at the same elevation and means for selectively controlling the operation of the foregoing means.

6. An automatic phonograph comprising a tone arm, a plurality of record discs arranged one above the other to provide upper and lower stack parts between which the tone arm travels to play the topmost record of the lower stack part, a turntable upon which the lower stack part is supported, means for rotating said turntable, screws which are engageable with the peripheral edges of said discs one at a time and which support the upper stack part, said screws having threads leading from the uppermost record disc of the lower stack part to the lowermost record disc of the upper stack part and being rotatable in opposite directions to transfer record discs from each of said stack parts to the other, said screws being operative to transfer one record from one stack part to the other for each revolution, means for rotating said screws in opposite directions, means driven in timed relation to said last named means for elevating said turntable a distance equal to the height of a record disc for each disc transferred from the lower stack part to the upper and for lowering said turntable the same distance for each disc transferred from the upper stack part to the lower, whereby each record is played at the same elevation and means for selectively controlling the operation of the foregoing means.

7. An automatic phonograph comprising a tone arm, a plurality of record discs arranged one above the other to provide upper and lower stack parts between which the tone arm travels to play the topmost record of the lower stack part, two series of selector elements to selectively control the playing of the records, the elements of one series being arranged in staggered relation with respect to the elements of the other, means for supporting the upper stack part, a turntable for rotatably supporting the lower stack part, a carriage upon which said turntable is mounted, means for transferring records from each of said stack parts to the other, means operable in correlation with said transfer means for adjusting the height of said carriage to variable and predetermined positions so that each record is played at the same elevation, means for driving said last two-named means including circuit means, a clutch and a switch and a device carried by said carriage and actuated by said elements at different elevations for operating said switch, said device including upper and lower strips which are so spaced that if all of said elements are in operative positions the elements of the two series are engaged in alternation.

8. An automatic phonograph comprising a tone arm, a plurality of record discs arranged one above the other to provide upper and lower stack parts, a shaft to which said tone arm is connected, a member fixed to said shaft, means for latching said member in a position in which said tone arm is held at one side of said records, resilient means which is operative when said latching means is released to move the tone arm to a starting position between said stack parts so that it may be lowered upon the topmost record of the lower stack part, a turntable upon which the lower stack part is carried, a supporting frame, a carriage suspended from said frame upon which said turntable is mounted, screws mounted upon said frame which support the upper stack part and which are engageable with the peripheral edges of said discs one at a time, said screws having threads leading from the uppermost record disc of the lower stack part to the lowermost record disc of the upper stack part, means for rotating said screws in opposite directions to transfer records from each of said stack parts to the other, means operable in correlation with said transfer means for adjusting said carriage vertically to variable and predetermined positions so that each record is played at the same elevation, means for driving said last two-named means including a clutch, selector means for controlling the release of said latching means, means controlled by the movement of said member for releasing said clutch and means for restoring said tone arm and member to their original positions upon completion of the playing of a record and for re-engaging said clutch.

9. An automatic phonograph comprising a tone arm, a plurality of record discs arranged one above the other to provide upper and lower stack parts, a shaft to which said tone arm is connected, a member fixed to said shaft, means for latching said member in a position in which said tone arm is held at one side of said records, resilient means which is operative when said latching means is released to move the tone arm to a starting position between said stack parts so that it may be lowered upon the topmost record of the lower stack part, a turntable upon which the lower stack part is carried, a supporting frame, a carriage suspended from said frame upon which said turntable is mounted, screws mounted upon said frame which support the upper stack part and which are engageable with the peripheral edges of said discs one at a time, said screws having threads leading from the uppermost record disc of the lower stack part to the lowermost record disc of the upper stack part, means for rotating said screws in opposite directions to transfer records from each of said stack parts to the other, means operable in correlation with said transfer means for adjusting said carriage vertically to variable and predetermined positions so that each record is played at the same elevation, a motor drive unit for driving said last two-named means, a circuit in which said unit is included, a clutch, selector means for controlling the release of said latching means, means controlled by the movement of said member for releasing said clutch and opening said circuit and means for restoring said tone arm and member to their original positions upon completion of the playing of a record and for re-engaging said clutch and closing said circuit.

10. An automatic phonograph comprising a tone arm, a plurality of record discs arranged one above the other to provide upper and lower stack parts, a shaft to which said tone arm is connected, a member fixed to said shaft, means for latching said member in a position in which said tone arm is held at one side of said records, resilient means which is operative when said latching means is released to move the tone arm to a starting position between said stack parts so that it may be lowered upon the topmost record of the lower stack part, a turntable upon which the lower stack part is carried, a supporting frame, a carriage suspended from said frame upon which said turntable is mounted, screws mounted upon said frame which support the upper stack part and which are engageable with the peripheral edges of said discs one at a time, said screws having threads leading from the uppermost record disc of the lower stack part to the lowermost record disc of the upper stack part, means for rotating said screws in opposite directions to transfer records from each of said stack parts to the other, means operable in correlation with said transfer means for adjusting said carriage vertically to variable and predetermined positions so that each record is played at the same elevation, a motor drive unit for driving said last two-named means, a clutch, selector means for controlling the release of said latching means, means controlled by the movement of said member in response to said resilient means for effecting the release of said clutch and a member driven by said unit for restoring said tone arm and first named member to their original positions upon completion of the playing of a record and for re-engaging said clutch.

11. An automatic phonograph comprising a tone arm, a plurality of record discs arranged one above the other to provide upper and lower stack parts, a shaft to which said tone arm is connected, a member fixed to said shaft, means for latching said member in a position in which said arm is held at one side of said records, resilient means which is operative when said latching means is released to move the tone arm to a starting position between said stack parts so that it may be lowered upon the topmost record of the lower stack part, a turntable upon which the lower stack part is carried, a supporting frame, a carriage suspended from said frame upon which said turntable is mounted, screws mounted upon said frame which support the upper stack part and which are engageable with the peripheral edges of said discs one at a time, said screws having threads leading from the uppermost record disc of the lower stack part to the lowermost record disc of the upper stack part, means for rotating said screws in opposite directions to transfer records from each of said stack parts to the other, means operable in correlation with said transfer means for adjusting said carriage vertically to variable and predetermined positions so that each record is played at the same elevation, a motor drive unit, a clutch for connecting the drive shaft of said unit to said last two-named means, selector means for controlling the release of said latching means, means controlled by the movement of said member in response to said resilient means for releasing said clutch and a member driven by said drive shaft for restoring said tone arm and first named member to their original positions upon completion of the playing of a record and for re-engaging said clutch.

12. An automatic phonograph comprising a tone arm, a plurality of record discs arranged one above the other to provide upper and lower stack parts between which the tone arm travels to play the topmost record of the lower stack part, a stationary support, a turntable upon which the lower stack part is carried, a carriage suspended from said support upon which said turntable is mounted, screws mounted upon said support which are engageable with the peripheral edges of said discs, said screws supporting the upper stack part, means for rotating said screws in opposite directions to transfer record discs from each of said stack parts to the other to enable any record in each to be presented as the topmost on said lower stack part, means operable in correlation with said transfer means for adjusting said carriage vertically to variable and predetermined positions so that each record is played at the same elevation and means for selectively controlling the operation of the foregoing means.

13. An automatic phonograph comprising a tone arm, a plurality of record discs arranged one above the other to provide upper and lower stack parts between which the tone arm travels to play the topmost record of the lower stack part, a stationary support, a turntable upon which the lower stack part is carried, a carriage suspended from said support upon which said turntable is mounted, screws mounted upon said support which are engageable with the peripheral edges of said discs, said screws supporting the upper stack part, means for rotating said screws in opposite directions to transfer record discs from each of said stack parts to the other, means operable in correlation with said transfer means for adjusting said carriage vertically to variable and predetermined positions so that each record is played at the same elevation, spring means interconnecting said support and said carriage for relieving said last named means from at least a part of the weight of said carriage and means for selectively controlling the operation of the foregoing means.

14. An automatic phonograph comprising a tone arm, a plurality of record discs arranged one above the other to provide upper and lower stack parts between which the tone arm travels to play the topmost record of the lower stack part, a stationary support, a turntable upon which the lower stack part is carried, a carriage suspended from said support upon which said turntable is mounted, a motor carried by said carriage for rotating said turntable, resilient means for supporting at least a part of the weight of said carriage, screws mounted upon said support which are engageable with the peripheral edges of said discs, said screws supporting the upper stack part, means for rotating said screws in opposite directions to transfer record discs from each of said stack parts to the other, means operable in synchronism with said transfer means for simultaneously adjusting said carriage vertically to variable and predetermined positions so that each record is played at the same elevation and means for selectively controlling the operation of the foregoing means.

15. An automatic phonograph comprising a tone arm, a plurality of record discs arranged one above the other to provide upper and lower stack parts between which the tone arm travels to play the topmost record of the lower stack part, a stationary support, a turntable upon which the lower stack part is carried, a carriage suspended from said support upon which said turntable is mounted, vertical spindles carried by said support, screws fixed to said spindles which are engageable with the peripheral edges of said discs, said screws supporting the upper stack part, means for driving said spindles to rotate said screws in opposite direction to transfer record discs from each of said stack parts to the other, means connecting said spindles and carriage, whereby as the former are driven for the purpose described said carriage is adjusted vertically to predetermined positions so that each record is played at the same elevation and means for selectively controlling the operation of the foregoing means.

16. An automatic phonograph comprising a tone arm, a plurality of record discs arranged one above the other to provide upper and lower stack parts between which the tone arm travels to play the topmost record of the lower stack part, a stationary support, a turntable upon which the lower stack part is carried, a carriage upon which said turntable is mounted, resilient means for suspending said carriage from said support, vertical spindles carried by said support, screws fixed to said spindles which are engageable with the peripheral edges of said discs, said screws supporting the upper stack part, means for driving said spindles to rotate said screws in opposite directions to transfer record discs from each of said stack parts to the other, means connecting said spindles and carriage, whereby as the former are driven for the purpose described said carriage is adjusted vertically to predetermined positions so that each record is played at the same elevation and means for selectively controlling the operation of the foregoing means.

17. An automatic phonograph comprising a tone arm, a plurality of record discs arranged one above the other to provide upper and lower stack parts between which the tone arm travels to play the topmost record of the lower stack part, a stationary support, vertical spindles carried by said support, screws fixed to said spindles which are engageable with the peripheral edges of said discs, said screws supporting the upper stack part, a turntable upon which the lower stack part is carried, a carriage upon which said turntable is mounted, threaded posts mounted upon said carriage, threaded elements carried by said spindles which screw upon said posts, means for driving said spindles to rotate said screws in opposite directions to transfer record discs from each of said stack parts to the other, the rotation of said spindles through the agency of said threaded elements and posts effecting the simultaneous vertical adjustment of said carriage to predetermined positions so that each record is played at the same elevation and means for selectively controlling the operation of the foregoing means.

18. An automatic phonograph comprising a tone arm, a plurality of record discs arranged one above the other to provide upper and lower stack parts between which the tone arm travels to play the topmost record of the lower stack part, means for rotatably supporting the lower stack part, three screws which are engageable with the peripheral edges of said discs at points substantially 120° apart, said screws supporting the upper stack part and being rotatable in opposite directions to transfer record discs from each of said stack parts to the other, means for driving said screws in opposite directions and means for selectively controlling the operation of said last named means.

19. An automatic phonograph comprising a tone arm, a plurality of record discs arranged one above the other to provide upper and lower stack parts between which the tone arm travels to play the topmost record of the lower stack part, means for rotatably supporting the lower stack part, screws which are engageable with the peripheral edges of said discs and which are adapted to support the upper stack part, each of said screws having a cylindrical body portion and a reduced base portion and being formed with a spiral groove, the lower wall of which forms a supporting shoulder, said body portion being formed with a rib which forms a continuation of said lower wall and which crosses said reduced base portion, means for rotating said screws in opposite directions to transfer record discs from each of said stack parts to the other and means for selectively controlling the operation of said last named means.

20. An automatic phonograph comprising a tone arm, a plurality of record discs arranged one above the other to provide upper and lower stack parts between which the tone arm travels to play the topmost record of the lower stack part, means for rotatably supporting the lower stack part, screws for supporting the upper stack part and for transferring records from one stack part to the other, each of said screws being formed with a spiral groove which traverses an angular distance of substantially 360° and which leads from the uppermost record disc of the lower stack part to the lowermost record disc of the upper stack part, the lower wall of said groove providing a supporting shoulder which engages the peripheral edges of said discs one at a time, means for rotating said screws in opposite directions and means for selectively controlling the operation of said last named means.

21. An automatic phonograph comprising a tone arm, a plurality of record discs arranged one above the other to provide upper and lower stack parts between which the tone arm travels to play the topmost record of the lower stack part, means for rotatably supporting the lower stack part, screws for transferring records from one stack part to the other, each of said screws being formed to provide a spiral shoulder which leads from the uppermost record disc of the lower stack part to the lowermost record disc of the upper stack part and which is engageable with the marginal edges of said discs one at a time, and a ledge to which said shoulder leads, said ledge providing a support for the upper stack part, means for rotating said screws in opposite directions and means for selectively controlling the operation of said last named means.

22. An automatic phonograph comprising a tone arm, a plurality of record discs arranged one above the other to provide upper and lower stack parts between which the tone arm travels to play the topmost record of the lower stack part, means for rotatably supporting the lower stack part, screws for transferring records from one stack part to the other, each of said screws being formed to provide a spiral shoulder which leads from the uppermost record disc of the lower stack part to the lowermost record disc of the upper stack part, which is engageable with the marginal edges of said discs one at a time and which traverses an angular distance of 360°, said shoulder leading to an annular ledge of a substantially uniform elevation which is adapted to provide a support for the upper stack part, means for rotating said screws in opposite directions and means for selectively controlling the operation of said last named means.

23. An automatic phonograph comprising a tone arm, a plurality of disc-like record holders arranged one above the other to provide upper and lower stack parts between which the tone arm travels to play the topmost record of the lower stack part, said holders having beveled marginal edges, means for rotatably supporting the lower stack part, screws for supporting the upper stack part and for transferring record holders from one stack part to the other to move records in either stack part from or to a playing position, each of said screws being formed with a spiral shoulder which is engageable with the beveled edges of said holders and which has substantially the same angularity as said beveled edges, means for rotating said screws in opposite directions and means for selectively controlling the operation of said last named means.

24. An automatic phonograph comprising a tone arm, a plurality of disc-like record holders arranged one above the other to provide upper and lower stack parts between which the tone arm travels to play the topmost record of the lower stack part, said holders having beveled marginal edges, means for rotatably supporting the lower stack part, screws for transferring record holders from one stack part to the other, each of said screws being formed with a spiral shoulder which is engageable with the beveled edges of said holders and which leads to a ledge for supporting the upper stack part, said shoulder and ledge having substantially the same angularity as the beveled edges of said holders, means for rotating said screws in opposite directions and means for selectively controlling the operation of said last named means.

25. An automatic phonograph comprising a tone arm, a plurality of record discs arranged one above the other to provide upper and lower stack parts between which the tone arm travels to play the topmost record of the lower stack part, screws for supporting the upper stack part and for transferring records from one stack part to the other, each of said screws being formed to provide a spiral shoulder which is engageable with the marginal edges of said discs and which traverses an angular distance of substantially 360°, means for rotating said screws in opposite directions and means for selectively controlling the operation of said last named means.

26. An automatic phonograph comprising a tone arm, a plurality of records arranged in a group, said group consisting of two spaced parts between which the tone arm passes to play the leading record of one of said parts, means for rotating said record, transfer means associated with each group part for transferring records from the part with which they are associated to said other part to thereby position any selected record as the leading record of said one part, means adapted to support each of said parts in spaced relation while the records are transferred therebetween, and means for selectively controlling the operation of said transfer means.

27. An automatic phonograph comprising a tone arm, a record stack consisting of upper and lower spaced parts between which the tone arm travels to play the topmost record of the lower stack part, means for supporting the upper stack part, means for rotatably supporting the lower stack part, transfer means associated with each of said parts for transferring records from the part with which they are associated to said other part to thereby position any selected record as the topmost record of the lower stack part, said supporting means being adapted to maintain each of said parts in spaced relation while the records are transferred therebetween, and means for selectively controlling the operation of said transfer means.

28. The combination of claim 27 wherein said transfer means is adapted to individually transfer said records.

29. An automatic phonograph comprising a tone arm, a record stack consisting of upper and lower spaced parts between which the tone arm travels to play the topmost record of the lower stack part, means for supporting the upper stack part, means for rotatably supporting the lower stack part, transfer means associated with each of said parts for transferring records from the part with which they are associated to said other part to thereby position any selected record as the topmost record of the lower stack part, said supporting means being adapted to maintain each of said parts in spaced relation while the records are transferred therebetween, and means operable in corelation with said transfer means for vertically adjusting said last named supporting means to variable and predetermined positions so that each record may be played at the same elevation.

30. The combination of claim 29 including means for selectively controlling the operation of said transfer means and said adjusting means.

31. The combination of claim 29 including means for selectively controlling the operation of said transfer means and said adjusting means, and means for simultaneously operating said adjusting means in synchronism with said transfer means.

32. The combination of claim 29 including means for selectively controlling the operation of said transfer means and said adjusting means, said transfer means being adapted to individually transfer said records.

33. The combination of claim 29 including means for selectively controlling the operation of said transfer means and said adjusting means, and means for simultaneously operating said adjusting means in synchronism with said transfer means, said transfer means being adapted to individually transfer said records.

34. The combination of claim 29 that includes driving means for driving said transfer means and said adjusting means, said driving means including a clutch, selector means identified with said records for selectively controlling the playing of the records, and means actuated by said selector means for controlling the operation of said clutch to discontinue the operation of said transfer means.

35. An automatic phonograph comprising a tone arm, a record stack consisting of upper and lower spaced parts between which the tone arm travels to play the topmost record of the lower stack part, means for supporting the upper stack part, a turntable for rotatably supporting the lower stack part, transfer means associated with each of said parts for transferring records from the part with which they are associated to said other part to thereby position any selected record as the topmost record of the lower stack part, means for simultaneously lowering said turntable as records are transferred to the lower stack part, means for raising said turntable as the records are transferred to the upper stack part whereby records from each of said stack parts may be moved to the playing position on top of said lower stack part, and means for selectively controlling the operation of said last named means, said supporting means maintaining each of said parts in spaced apart relation while the records are transferred therebetween.

36. The combination of claim 35 wherein said transfer means is adapted to individually transfer said records.

37. The combination of claim 35 including driving means for driving said transfer means and adapted to simultaneously impart corelated vertical movement to said turntable, selector elements identified with said records and operable to cause actuation of said driving means to selectively control the playing of the records, and automatic control means so constructed and arranged as to prevent actuation of said transfer means upon operation of any selector element when the record last played is the one controlled by the same selector element when next operated.

38. An automatic phonograph comprising a tone arm, a plurality of record discs arranged one above the other to provide upper and lower stack parts between which the tone arm travels to play the topmost record of the lower stack part, means for supporting the upper stack part, a turntable upon which the lower stack part is carried, a carriage upon which said turntable is mounted, transfer means associated with each of said parts for transferring records from the part with which they are associated to said other part to thereby position any selected record as the topmost record of the lower stack part, and adjusting means operable in corelation with said transfer means for adjusting said carriage vertically to variable and predetermined positions so that each record may be played at the same elevation, said supporting means maintaining each of said stack parts in spaced-apart relation while the records are being transferred therebetween.

39. The combination of claim 38 that includes means for simultaneously operating said adjusting means in synchronism with said transfer means.

40. The combination of claim 38 that includes a motor on said carriage for driving said turntable.

41. The combination of claim 38 that includes resilient means constraining said carriage upwardly to relieve said adjusting means from at least a part of the weight of said carriage.

42. The combination of claim 38 that includes resilient means for supporting at least a part of the weight of said carriage.

43. An automatic phonograph comprising a tone arm, a vertical stack of records, said stack consisting of two vertically spaced stack parts between which the tone arm passes to play the leading record of one of said parts, transfer means associated with each of said stack parts for transferring the individual records from the stack part with which they are associated to said other part to thereby position any selected record as the topmost record of the lower stack part, selector elements identified with said records and adapted to actuate said transfer means to selectively control the playing of the records, and control means constructed to cooperate with said selector elements and arranged to be effective during or after the playing of any one of the said records upon actuation of the selector element identified with said one record, to withhold the operation of said transfer means and to cause said record to be replayed.

44. In a phonograph, a vertically movable turntable adapted to support one or more records during playing, record supporting mechanism for a stack of records in vertical alignment with and in spaced relationship to said turntable, cam-like transferring mechanism for individually carrying records from said supporting mechanism to said turntable and from said turntable to said supporting mechanism and means operable with said transferring mechanism, whenever the latter carries a record from said supporting mechanism to said turntable, to lower said turntable a distance equal to the thickness of a record, and operable to raise said turntable a similar distance whenever said transferring mechanism carries a record from said turntable to said supporting mechanism, whereby each record when uppermost on said turntable is at a common playing position.

45. An automatic phonograph, comprising a vertically reciprocable turntable for supporting one or more records during playing, record supporting mechanism for a stack of records in vertical alignment with and in spaced relationship to said turntable, cam-like transferring mechanism for individually carrying records from said supporting mechanism to said turntable, and from said turntable to said supporting mechanism, means operable with said transferring mechanism, whenever the latter carries a record from said supporting mechanism to said turntable, for lowering said turntable a distance equal to the thickness of a record, and for raising said turntable a similar distance whenever said transferring mechanism carries a record from said turntable to said supporting mechanism, whereby each record when uppermost on said turntable is at a common playing position, selector elements identified with said records, and means controlled by said selector elements to cause actuation of said transferring mechanism and said turntable raising and lowering means to selectively control the playing of the records.

46. An automatic phonograph for selectively playing any selected one of a plurality of records comprising a tone arm, a vertical record stack consisting of upper and lower vertically spaced stack parts between which the tone arm travels to play the topmost record of the lower stack part, a vertically movable turntable for rotatably supporting said records, transfer means associated with each of said stack parts for transferring individual records from the stack part with which they are associated to said other stack part to thereby position any selected record as the topmost record of the lower stack part, said transfer means being effective for moving said turntable upwardly or downwardly or in both directions in variable degree in each cycle of transfer operations to insure the positioning in the same pre-determined horizontal plane of each record selected for playing, automatic means operatively associated with said transfer means for automatically determining the initial direction of said variable movement of the turntable in accordance with its direction of movement in the preceeding cycle of transfer operations and manipulating means for selectively instituting operation of said automatic means.

EDWARD A. EBERT.